United States Patent
Beaufort et al.

(10) Patent No.: US 10,427,878 B2
(45) Date of Patent: Oct. 1, 2019

(54) PATCH MATERIAL FOR REPAIRING A DAMAGED PORTION OF A PRESSING BELT

(71) Applicant: DEERE & COMPANY, Moline, IL (US)

(72) Inventors: David M Beaufort, Arc les Gray (FR); Frederic Perrotin, Le Tremblois (FR); Benoit Gagnepain, Gray (FR); Sebastien Hel, Gray (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/953,807

(22) Filed: Apr. 16, 2018

(65) Prior Publication Data
US 2018/0312337 A1    Nov. 1, 2018

(30) Foreign Application Priority Data
Apr. 26, 2017   (EP) .................................... 17168218

(51) Int. Cl.
*B65G 15/00* (2006.01)
*B65G 15/34* (2006.01)
(Continued)

(52) U.S. Cl.
CPC .............. *B65G 15/34* (2013.01); *A01F 15/07* (2013.01); *A01F 15/18* (2013.01); *B29C 73/10* (2013.01);
(Continued)

(58) Field of Classification Search
None
See application file for complete search history.

(56) References Cited

U.S. PATENT DOCUMENTS

| 4,023,671 A | 5/1977 | Kramer |
| 4,185,447 A * | 1/1980 | Howerton ............. A01D 78/06 198/515 |

(Continued)

FOREIGN PATENT DOCUMENTS

WO    2016034821 A1    3/2016

OTHER PUBLICATIONS

European Search Report issued in counterpart application No. 17168218.0 dated Nov. 7, 2017. (5 pages).

*Primary Examiner* — Kavel Singh

(57) ABSTRACT

A patch material for repairing a damaged portion of a pressing belt used on an agricultural round baler includes an operative outer polymeric layer having a first thickness, a mounting layer disposed parallel to the operative outer polymeric layer and having a second thickness being less than the first thickness, and at least one fabric layer disposed between the operative outer polymeric layer and the mounting layer. A plurality of linear outlines is defined on the operative outer polymeric layer at an operative top surface thereof. The linear outlines are configured to define a pattern with a plurality of predefined shapes. The plurality of the predefined shapes is configured to border a conical portion of a connecting opening defined on the operative top surface of the operative outer polymeric layer. The connecting opening extends the operative outer polymeric layer, the fabric layer, and the mounting layer.

20 Claims, 6 Drawing Sheets

(51) Int. Cl.
*B65G 15/30* (2006.01)
*A01F 15/18* (2006.01)
*F16G 3/08* (2006.01)
*A01F 15/07* (2006.01)
*B29C 73/10* (2006.01)
*B30B 5/04* (2006.01)
*B30B 9/30* (2006.01)
*B29L 31/00* (2006.01)

(52) U.S. Cl.
CPC .............. *B30B 5/04* (2013.01); *B30B 9/3003* (2013.01); *F16G 3/08* (2013.01); *A01F 2015/077* (2013.01); *A01F 2015/078* (2013.01); *A01F 2015/183* (2013.01); *B29L 2031/709* (2013.01); *B32B 2413/00* (2013.01)

(56) References Cited

U.S. PATENT DOCUMENTS

| 4,696,332 | A | * | 9/1987 | Koch | ...................... B29C 73/06 |
| | | | | | 152/367 |
| 2002/0134652 | A1 | | 9/2002 | Jakob | |
| 2006/0016670 | A1 | | 1/2006 | Perkins | |
| 2008/0207370 | A1 | | 8/2008 | Jakob | |

* cited by examiner

PATCH MATERIAL FOR REPAIRING A DAMAGED PORTION OF A PRESSING BELT

RELATED APPLICATIONS

This application claims priority to European Patent Application Ser. No. 17168218.0, filed Apr. 26, 2017, the disclosure of which is hereby incorporated by reference in its entirety.

FIELD OF THE DISCLOSURE

The present disclosure relates to patch material for repairing belts, and in particular, to a patch material for repairing belts for balers in the field.

BACKGROUND

Variable chamber balers for baling round bales include a single or multiple parallel continuous belts passing over and under a series of drives, idlers and rollers so as to be configured in a continuously closed manner. The belts function to cause incoming material into the baling chamber where the incoming material is compressed into spiral roll of increasing diameter. This compressed spiral roll of incoming material is discharged into the field when a pre-determined size is reached.

During continuous operation of the baler, the belt tends to develop slits and holes which may lead to serious damages. A damaged belt needs to be replaced or repaired in order to be able to continue high quality baling. Currently, substantial time is required for repairing or replacing a belt. This increases the down time of the baler. Hence, there was felt a requirement for repairing the belts in-situ in order to reduce the down time of the balers.

In the prior art, US20060016670 discloses a kit for patching worn areas in a conveyor belt. However, the patches provided in the kit can be applied to conveyer belts and is not feasible for high pressure belts, such as, the belts used in balers.

Furthermore, in the prior art, US20020134652 discloses a conveyor belt comprising three parts, namely an upper part, a lower part and an intermediate part are assembled by using simple placement of screws. However, this cannot be applied to baler belts, since the repaired part would interfere with the rollers of a bale chamber and possibly get damaged. Further, the pressure on the screws is substantially high and hence will fail to sustain the load exerted by the baler belt.

Hence, the present disclosure provides an alternative solution to existing repair kits for belts which is suitable for baler belts to repair them in-situ, in order to reduce the down time of the balers.

SUMMARY

In a first embodiment of the present disclosure, a patch material is provided for repairing damaged belts for agricultural equipment, particularly belts for round balers with variable chambers. This helps in easily repairing the belts in-situ and thereby reduce the downtime of the machine.

A patch material for repairing a damaged portion of a belt, particularly a pressing belt or a conveying belt on an agricultural machine, includes an operative outer polymeric layer having a first thickness, a mounting layer parallel to the operative outer polymeric layer and having a second thickness; the second thickness being substantially lower than the first thickness, at least one ply fabric is sandwiched between the operative outer polymeric layer and the mounting layer, a plurality of linear outlines defined on the operative outer polymeric layer at an operative top surface thereof; the linear outlines being configured to define a pattern with a plurality of predefined shapes, wherein at least a plurality of the predefined shapes are configured to border a conical opening on the operative top surface of the operative outer polymeric layer. The predefined shapes are selected from a group consisting at least one of a lozenge shape, diamond shape or square shape.

A combination of patch material, in accordance with the present disclosure, and a belt, particularly a pressing belt or a conveying belt on an agricultural machine is characterized in including an upside mounting part of patch material and an underside mounting part of patch material, wherein the shape of the upside mounting part is mirror-imaged to the shape of the underside mounting part, wherein the upside mounting part is placed with its mounting layer on an upside of a damaged portion of the belt and the underside mounting part is placed with its mounting layer on an underside of the damaged portion of the belt, wherein the mounting layers are facing each other and are sandwiching the damaged portion of the belt therebetween.

The linear outlines are formed by grooves. Alternatively, the linear outlines are formed by markings.

The linear outlines includes a first plurality of parallel outlines and a second plurality of parallel outlines, wherein outlines of the first plurality of parallel outlines are crossing outlines of the second plurality of parallel outlines. The outlines of the first plurality of parallel outlines and second plurality of parallel outlines are spaced apart by a requisite first distance along the operative top surface of the patch material.

The linear outlines includes a third plurality of parallel outlines, a portion of the third plurality of parallel outlines crosses a portion of the first plurality of parallel outlines and a portion of the second plurality of parallel outline. The outlines of the third plurality of parallel outlines are spaced apart by a requisite second distance along the operative top surface of the patch material.

The outlines of the first plurality of parallel outlines and second plurality of parallel outlines define at least one of a predefined angle with respect to the third plurality of parallel outlines. The predefined angle is in the range of 45 degrees to 135 degrees.

The linear outlines include a plurality of fourth parallel outlines, wherein the outlines of the fourth plurality of parallel outlines are perpendicular to outlines of the third plurality of outlines, wherein the outlines of the fourth plurality of outlines are spaced apart by a requisite third distance along the operative top surface of the patch material.

The patch material is configured to be cut into a desired shape of patch along the outlines of the first plurality of outlines, the second plurality of outlines, the third plurality of outlines or the fourth plurality of outlines.

The patch material is attached to a belt through fasteners such as a rivet, screw, washer or nut arrangement. The fasteners are embedded within peripheral material of the operative outer polymeric layer surrounding the conical openings.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
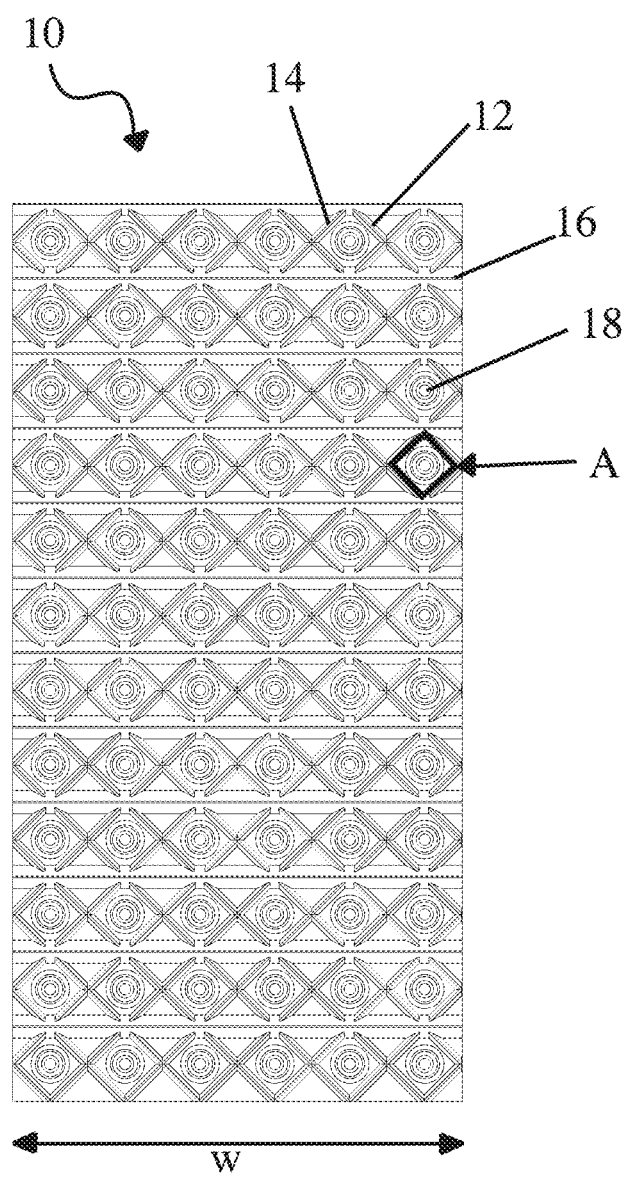
FIG. 1 illustrates a first embodiment of a patch material having a first pattern.
Figure 2:
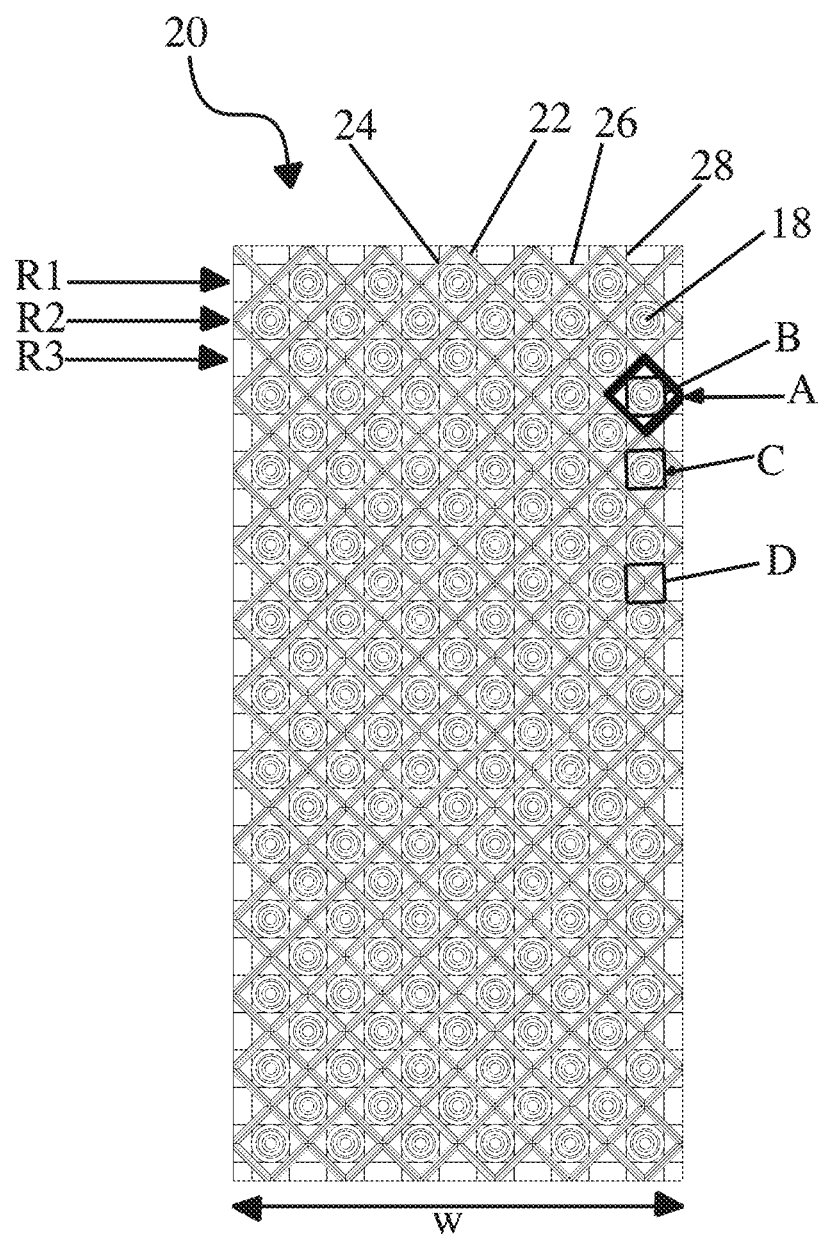
FIG. 2 illustrates a second embodiment of a patch material with a second pattern.
Figure 3:
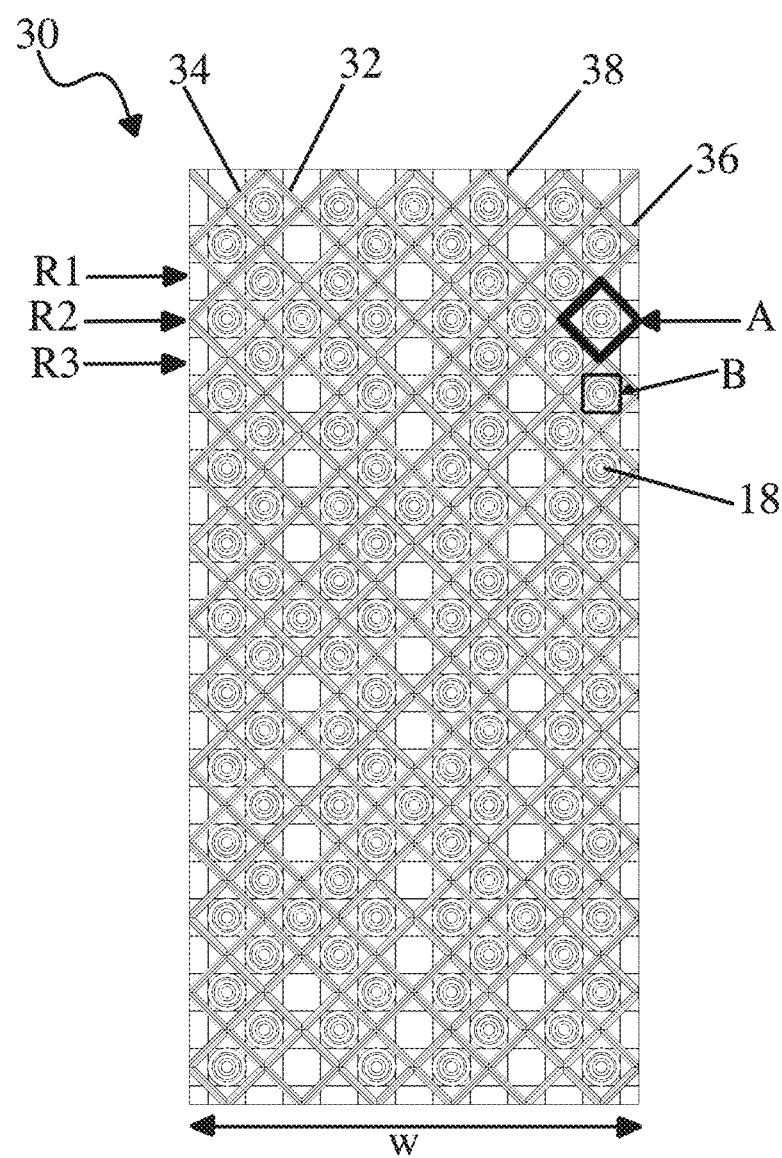
FIG. 3 illustrates a third embodiment of a patch material with a third pattern.
Figure 4:
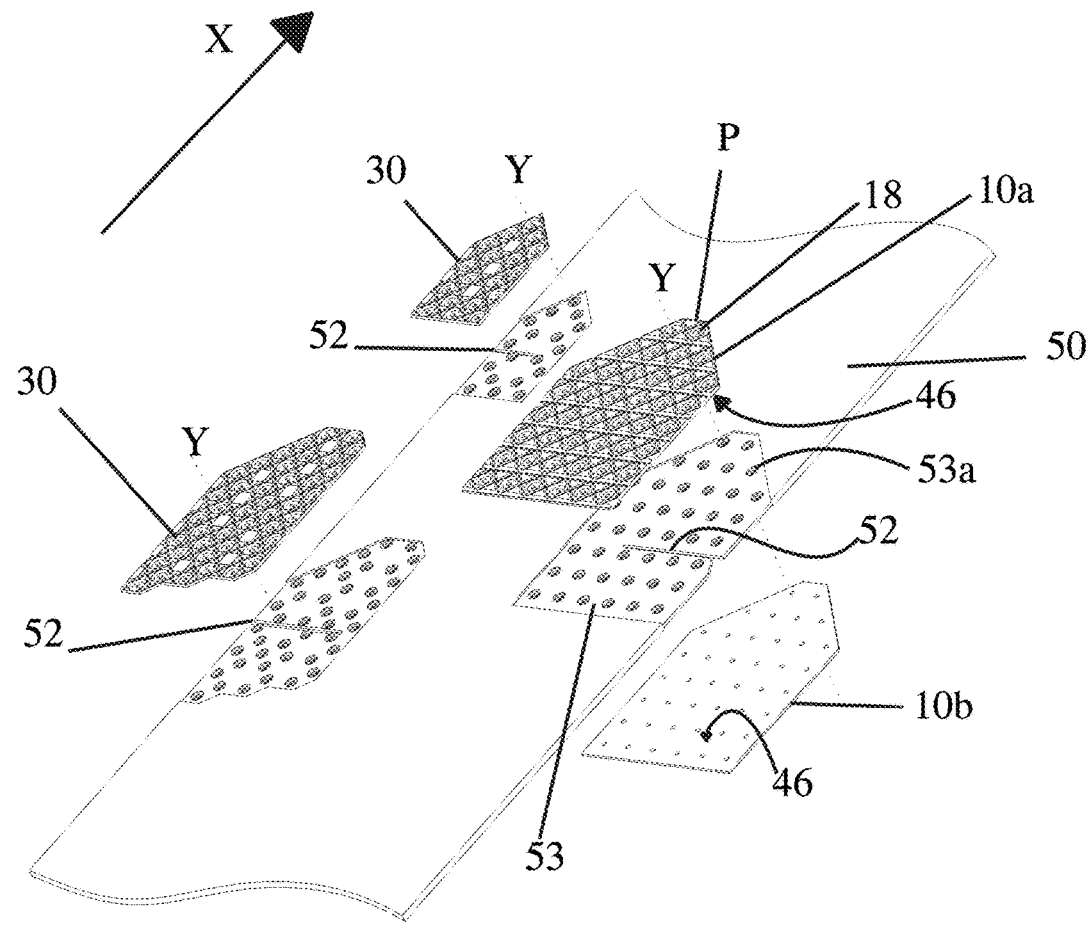
FIG. 4 illustrates a damaged belt prepared to be mended with cut-out patches of the patch material as illustrated in FIG. 1.
Figure 5:
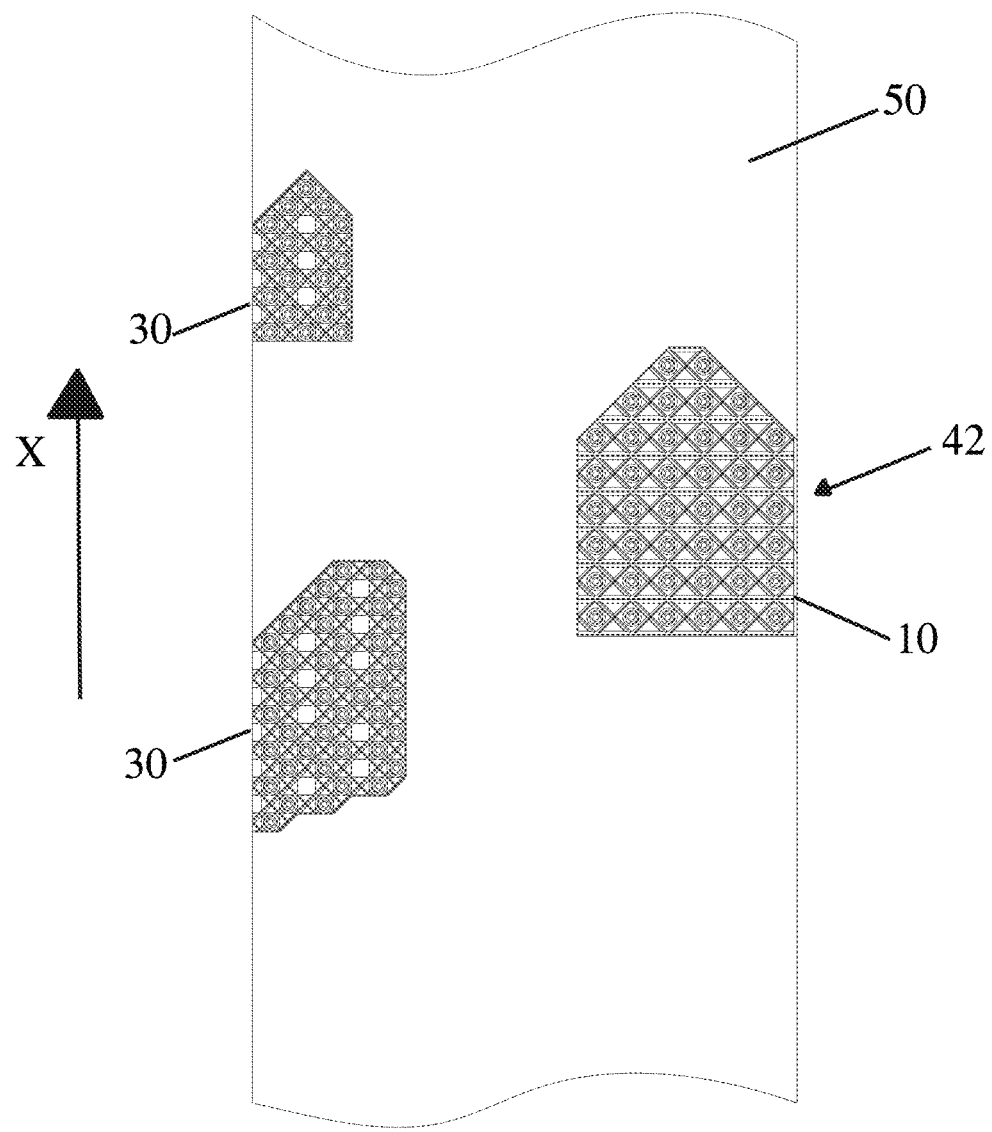
FIG. 5 illustrates the damaged belt of FIG. 4 being repaired by the cut-out patches.
Figure 6:
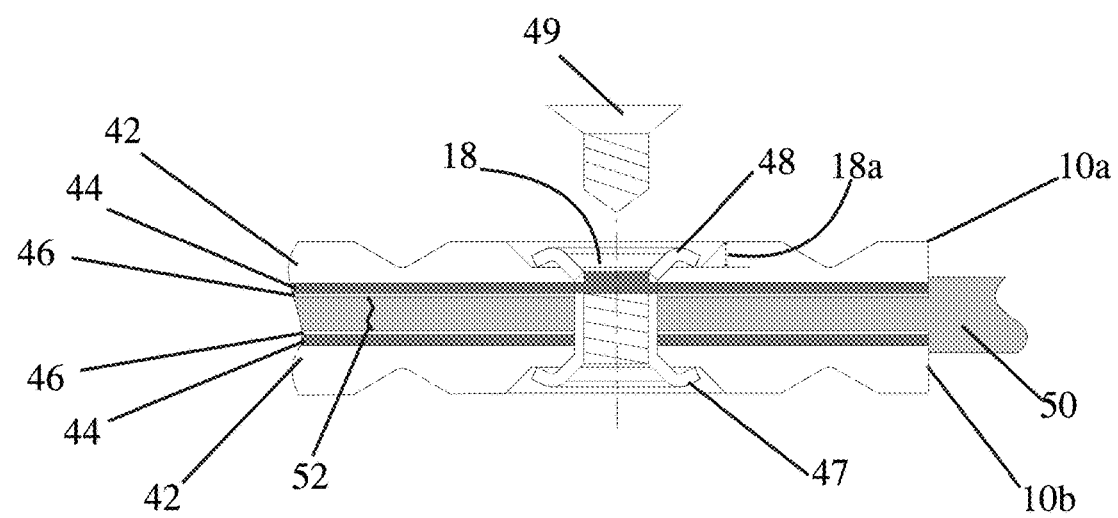
FIG. 6 is a cross-section of the repaired belt of FIG. 4 including fasteners used for repairing a damaged belt.

FIG. 1, FIG. 2 and FIG. 3 illustrate different embodiments of patch materials, generally referenced by the numerals 10, 20 and 30 used for repairing belts, specifically belts used in balers. The belts used in balers are under high pressure, hence the patches used for repairing these patches are required to be configured to withstand such high pressure loads. FIG. 4, FIG. 5 and FIG. 6 illustrate repairing the damaged belts as well as parts of the patch material (10, 20, 30). The patch material (10, 20 and 30), in accordance with the present disclosure, includes an operative outer polymeric layer (42), a fabric layer (44) and a mounting bottom polymeric layer (46). The fabric layer (44) is sandwiched between the operative outer polymeric layer (40) and the mounting bottom polymeric layer (42). The patch materials (10, 20 and 30) are in the form of elongated sheets having a pre-defined length and a pre-defined width (w). The operative outer polymeric layer (42) has a first thickness while the mounting bottom polymeric layer (46) has a second thickness. The second thickness of the mounting bottom polymeric layer (46) is substantially lower than the first thickness of the operative outer polymeric layer (42).

Although the patch material (10, 20, 30), illustrated in FIG. 1, FIG. 2 and FIG. 3, will be described, a person skilled in the art will appreciate that several other embodiments may be adapted within the spirit and scope of this disclosure. This application is therefore intended to cover any variations, uses, or adaptations of the disclosure using its general principles.

Referring specifically to FIG. 1, the patch material (10) includes a plurality of delineators. The plurality of delineators includes a first plurality of parallel delineators (12), a second plurality of parallel delineators (14) and a third plurality of parallel delineators (16). The plurality of delineators (12), (14), (16) include linear segments that delineate or outline regions of the patch material (10). As such, the plurality of delineators (12), (14), (16) are alternatively referred to herein as a plurality of linear outlines, i.e. the first plurality of parallel outlines (12), the second plurality of parallel outlines (14), and the third plurality of parallel outlines (16). The first plurality of parallel outlines (12) and the second plurality of parallel outlines (14) are spaced apart by a requisite first distance. The third plurality of parallel outlines (16) is spaced apart by a requisite second distance along the length of the patch material (10). Each of the third plurality of parallel outlines (16) span across the pre-defined width (w) of the patch material (10). The plurality of parallel outlines (12, 14, 16) may be defined by grooves. The depth of the third plurality of parallel outlines (16) may be of deeper grooves compared to the first and second parallel outlines (12, 14) while the grooves of the first plurality of parallel outlines (12) and the second plurality of parallel outlines (14) are substantially superficially formed.

At least a portion of the first plurality of parallel outlines (12) crosses at least a portion of the second plurality of parallel outlines (14). The first plurality of parallel outlines (12) and the second plurality of parallel outlines (14) are configured to define a pattern of predefined shapes formed therebetween. The predefined shapes are in the form of a plurality of first parallelograms (A). The plurality of first parallelograms (A) are bounded by a portion of a pair of the first plurality of parallel outlines (12) and a pair of the second plurality of parallel outlines (14). The plurality of first parallelograms (A) may be arranged in a row between pairs of the third plurality of parallel outlines (16). In the embodiment of the patch material (10), as illustrated in FIG. 1, each of the plurality of first parallelogram (A) is provided with an opening (18) or through-hole extending through the operative outer polymeric layer (42), the fabric layer (44) and the mounting bottom polymeric layer (46). The peripheral material of openings (18) on the inner side of the first parallelograms (A) are configured to form a conical portion (18a) bordering the openings (18), on the operative top surface of the operative outer polymeric layer (42), particularly indicated in FIG. 6. Each of the predefined shapes is a diamond shape, lozenge shape, square shape, rectangular shape, rhombus shape or rhomboid shape. The conical portions (18a) are opening out into the connecting openings (18).

Referring to FIG. 2, a second embodiment of the patch material, in accordance with the present disclosure is illustrated. The second embodiment of the patch material is generally illustrated by the reference numeral (20). The patch material (20) includes a plurality of delineators. The plurality of delineators includes a first plurality of parallel delineators (22), a second plurality of parallel delineators (24), a third plurality of parallel delineators (26) and a fourth plurality of parallel delineators (28). The plurality of delineators (22), (24), (26), (28) include linear segments that delineate or outline regions of the patch material (20). As such, the plurality of delineators (22), (24), (26), (28) are alternatively referred to herein as a plurality of linear outlines, i.e. the first plurality of parallel outlines (22), the second plurality of parallel outlines (24), the third plurality of parallel outlines (26), and the fourth plurality of parallel outlines (28).

The first plurality of parallel outlines (22) and the second plurality of parallel outlines (24) are perpendicular to each other. The first plurality of parallel outlines (22) and the second plurality of parallel outlines (24) are spaced apart by a requisite first distance. At least a portion of the first plurality of parallel outlines (22) crosses at least a portion of the second plurality of parallel outlines (24). The first plurality of parallel outlines (22) and the second plurality of parallel outlines (24) subtend, at a predefined angle, such as an acute angle and an obtuse angle respectively to the third plurality of parallel outlines (26). The predefined angle may be in the range of 45 degrees to 135 degrees.

The first plurality of parallel outlines (22) and the second plurality of parallel outlines (24) cross each other to define a pattern of predefined shapes therebetween. The predefined shapes formed by the first plurality of parallel outlines (22) and the second plurality of parallel outlines (24) are in the form of a plurality of second parallelogram (A).

The third plurality of parallel outlines (26) has a length spanning the width (w) of the patch material (20) and are spaced apart by a predefined distance along the length of the patch material (10). The fourth plurality of parallel outlines (28) are substantially perpendicular to the third plurality of parallel outlines (26). The fourth plurality of parallel outlines (28) are spaced apart by a predefined distance along the width (w) of the patch material (10) and has a length spanning the length of the patch material (20). The third plurality of parallel outlines (26) are spaced apart by a requisite second distance along the length of the patch material (10). The fourth plurality of outlines (28) are spaced apart by a requisite third distance along the operative top surface of the patch material (20). The third plurality of parallel outlines (26) and the fourth plurality of parallel outlines (28) cross each other at a right angles to define a pattern of predefined shapes formed therebetween. The predefined shapes are in the form of a plurality of second parallelogram (B).

The size of the plurality of first parallelogram (A) is substantially larger than the plurality of second parallelogram (B). The plurality of first parallelogram (A) is configured, such that, the plurality of first parallelogram (A) are angularly displaced by predefined angle with respect to the plurality of second parallelogram (B). The plurality of first parallelogram (A) is also arranged in rows extending along width (w) of the patch material (20) similar to that of the plurality of first parallelogram (A).

The first parallelogram (A) and the second parallelogram (B) of the plurality of first parallelograms and the plurality of second parallelogram, respectively, are of predefined shapes, such as a diamond shape, lozenge shape, square shape, rectangular shape, rhombus shape or rhomboid shape.

The plurality of first parallelogram (A) and the plurality of second parallelogram (B) are configured, such that, in each row of the plurality of second parallelogram (B), each of the alternate second parallelogram of the plurality of second parallelogram (B) is enclosed within a first parallelogram of the plurality of first parallelogram (A). Thus, the plurality of second parallelogram (B) which are enclosed within a first parallelogram of the plurality of first parallelogram (A) will henceforth be termed as enclosed second parallelogram (C).

Further, between each of the enclosed second parallelogram (C), there is defined a second parallelogram of the plurality of second parallelogram (B) wherein the first plurality of parallel outlines (22) and the second plurality of parallel outlines (24) cross each other to form "X shaped" intersection point. Thus, the plurality of second parallelogram (B) within which the "X shaped" intersection points are formed will henceforth be termed as intersection point second parallelogram (D). Thus, each row has an enclosed second parallelogram (C) and an intersection point second parallelogram (D) alternately arranged.

In the embodiment of the patch material (20), as illustrated in FIG. 2, each of the enclosed second parallelograms (C) are provided with openings (18) and conical portions (18a) shaped and configured as described with reference to FIG. 1 above. Thus, two enclosed second parallelogram (C) with the opening (18) are spaced apart by the intersection point second parallelogram (D). The peripheral material of openings (18) on the inner side of the second parallelograms (C) are configured to form a conical portion (18a) bordering the openings (18), on the operative top surface of the operative outer polymeric layer (42), particularly indicated in FIG. 6.

Referring to FIG. 3, a third embodiment of the patch material, in accordance with the present disclosure is illustrated. The third embodiment of the patch material is generally illustrated by the reference numeral (30). The construction of the patch material (30) is generally the same as of the patch material (20), illustrated in FIG. 2, as described above. The patch material (30) includes a plurality of delineators. The plurality of delineators includes a first plurality of parallel delineators (32), a second plurality of parallel delineators (34), a third plurality of parallel delineators (36) and a fourth plurality of parallel delineators (38). The plurality of delineators (32), (34), (36), (38) include linear segments that delineate or outline regions of the patch material (30). As such, the plurality of delineators (32), (34), (36), (38) are alternatively referred to herein as a plurality of linear outlines, i.e. the first plurality of parallel outlines (32), the second plurality of parallel outlines (34), the third plurality of parallel outlines (36), and the fourth plurality of parallel outlines (38). Furthermore, the provided openings (18) and conical portions (18a) are shaped and configured as described with reference to FIG. 1 above. However, only the positions of the openings (18) with the conical portions (18a) are defined differently in each of the enclosed second parallelogram (C), such that, the openings (18) on adjacent rows (R1, R2, R3) form a zig-zag pattern along the length of the patch material (30), wherein the openings are shaped and configured as described with reference to FIGS. 1 and 2 above. In the embodiments of the patch material (20 and 30), illustrated in FIG. 2 and FIG. 3, the first plurality of parallelograms (A) and the second plurality of parallelograms (B) are of predefined shapes, such as a diamond shape, lozenge shape, square shape, rectangular shape, rhombus shape or rhomboid shape.

In the embodiments of the patch material (10, 20, 30), illustrated in FIG. 1, FIG. 2 and FIG. 3, the first plurality of parallel outlines (12, 22, 32), the second plurality of parallel outlines (14, 24, 34), the third plurality of parallel outlines (16, 26, 36) and the fourth plurality of parallel outlines (28, 38) are defined by grooves which facilitate in providing flexibility to the patch material (10, 20, 30) when used in belts and caused to contour around the baler rollers. These grooves further help in easily cutting cut-outs of the patch material (10, 20, 30) with a knife along the grooves. Further, the shape of the grooves offers a chamfer on the leading edge of the cut-out of the patch material (10, 20, 30). Also, the grooves give a smoother profile when the patch material rubs against the baler rollers.

Alternatively, although not shown in Figures, the first plurality of parallel outlines (12, 22, 32), the second plurality of parallel outlines (14, 24, 34), a third plurality of parallel outlines (16, 26, 36) and a fourth plurality of parallel outlines (28, 38) may be defined by lines drawn on the patch material (10, 20, 30).

In the embodiments of the patch material (10, 20, 30), wherein, the first plurality of parallel outlines (12, 22, 32), the second plurality of parallel outlines (14, 24, 34), the third plurality of parallel outlines (16, 26, 36) and the fourth plurality of parallel outlines (28, 38) are formed by grooves, a desired size of cut-out can be easily formed.

FIG. 4 illustrates a belt (50) damaged with cuts (52). FIG. 5 illustrates the belt (50) repaired with the patch material (10, 20, 30). The method using the patch material (10, 20, 30) for repairing a damaged belt (50) will be described below with reference to FIG. 4, FIG. 5 and FIG. 6. The patch material (10 and 20), included in FIG. 4 and FIG. 5, for repairing of the damaged belt (50) is for illustrative purpose only. Any combination of the patch materials (10, 20 or 30) may be used for repairing the damage on the belt (50).

Referring to FIG. 4 and FIG. 5, a pair of cut-outs (10a and 10b) of the patch material (10), illustrated in FIG. 1, is cut with a knife. The cut-outs (10a and 10b) are cut as mirror images of each other. The size and shape of the cut-outs (10a and 10b) of the patch material (10) is dependent on the extent of the damage, such as, the size of the cut (52). The cut-outs (10a and 10b) are required to be formed with a leading edge (P), illustrated in FIG. 4. The leading edge (P) is a substantially narrow end, a pointed end or an arrow shape end as compared to the remaining portion of the cut-outs (10a and 10b). Thereafter, the area of the belt (50) around the cut (52) is required to be prepared to fix the cut-outs (10a, 10b) of the patch material (10). First, the area on either side of the belt (50) around the cut (52) is prepared by grinding to the shape of the cut-outs (10a, 10b) and a depth of less than the thickness of the patch material (10).

Once the prepared area (53) is formed on the damaged belt (50), the cut-outs (10a, 10b) of the patch material (10) are placed on the prepared area (53). The cut-outs (10a and 10b) are positioned on the belt (50), such that the leading edge (P) is in the direction of motion (X) of the belt (50). The number of openings (18), proximate the leading edge (P), may be altered to optimize the numbers of fixations. The position of the cut-outs (10a and 10b) on the belt (50) should not extend from the edge of the belt (50). Also, the edge of the cut-outs (10a and 10b), proximate the edge of the belt (50), are positioned such that the edge of the belt (50) and the edge of the cut-outs (10a, 10b) are offset through a distance, i.e., in the range of 2 mm to 20 mm.

The prepared area (53) is prepared such that the damaged portion, that is, the cut (52) is positioned substantially at the center of the prepared area (53). The cut-outs (10a and 10b) of the patch material (10) are placed on either sides of the belt (50), such that the mounting bottom polymeric layer (46) of the cut-outs (10a and 10b) contacts the prepared area (53) of the belt (50). Meanwhile, a plurality of holes (53a) are drilled on the prepared area (53) such that the corresponding openings (18) of the cut-outs (10a, 10b) of the patch material (10) and the holes (53a) are inline along the line Y indicated in FIG. 4 when the cut-outs (10a, 10b) of the patch material (10) are placed on the prepared area (53).

FIG. 6 particularly illustrates assembling of the cut-outs (10a and 10b) of the patch material (10) to the prepared area (53) of the belt (50). Referring to FIG. 4, FIG. 5 and FIG. 6, the cut-outs (10a and 10b) are assembled to the belt (50) by fasteners, such as a rivet, a screw, washer and nut arrangement or a combination thereof. The first column of openings (18) are offset from the edge in order not to have less than 5 mm between the bolts (49) and the edge of the belt (50).

FIG. 6 illustrates the assembly using a screw, a washer and a nut combination. The conical portion (18a) of the opening (18) of the cut-out (10a) is adapted to receive a washer, typically a conical washer (48), while the conical portion (18a) of the cut-outs (10b) is configured to receive a nut, typically an insert nut (47) with internal threads.

The conical portion (18a) is such that the conical washer (48) is embedded within the material of the operative outer polymeric layer (42). This prevents the fasteners from contacting parts of the baler roller and thereby minimizing wear and tear.

The insert nut (47) extends through the opening (18), such that one end of the insert nut (47) is proximate the conical washer (48). A bolt (49), having external threads, is allowed to pass through the conical washer (48), the hole (53a) and the insert nut (47). The bolt (49) is threadably fitted to the insert nut (47). Thus, the belt (50) is repaired by sandwiching the damaged portion of the belt (50), that is, the cut (52) between the cut-outs (10a and 10b) of the patch material (10). This also prepares the damaged belt (50) to withstand tension during operation.

Thus, using the patch material (10, 20, 30) illustrated in FIGS. 1-3, the damaged belts (50) can be repaired on the field with minimal effort and with accuracy. This reduces the downtime of the machines. This may be used on draper belts for combines or windrow grouper belts for mower conditioners or any crop conveyor belts on other agricultural equipment.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A patch material for repairing a damaged portion of a pressing belt used on an agricultural round baler, the patch material comprising:
   an operative outer polymeric layer having a first thickness, and an operative outer surface;
   a mounting layer disposed parallel to the operative outer polymeric layer and configured for placement against the pressing belt, the mounting layer having a second thickness being less than the first thickness;
   at least one fabric layer disposed between the operative outer polymeric layer and the mounting layer;
   a plurality of delineators disposed on the operative outer surface of the operative outer polymeric layer, wherein the plurality of delineators are arranged to define a pattern having a plurality of predefined shapes;
   a plurality of connecting openings extending through the operative outer polymeric layer, the at least one fabric layer, and the mounting layer;
   wherein, at least one of the plurality of the predefined shapes is arranged to bound a respective one of the plurality of connecting openings.

2. The patch material of claim 1, wherein said plurality of delineators are formed by grooves.

3. The patch material of claim 1, wherein the predefined shapes are selected from a group consisting at least one of a lozenge shape, a diamond shape or a square shape.

4. The patch material of claim 1, wherein each of the plurality of openings includes a respective conical portion leading into their respective connecting opening.

5. The patch material of claim 1, wherein:
   the plurality of delineators includes a first plurality of parallel delineators and a second plurality of parallel delineators; and
   wherein at least one of the first plurality of parallel delineators crosses at least one of the second plurality of parallel delineators.

6. The patch material of claim 5, wherein first plurality of parallel delineators and the second plurality of parallel delineators are spaced by a first distance along the operative outer surface.

7. The patch material of claim 5, wherein the plurality of linear delineators includes a third plurality of parallel delineators, wherein a portion of the third plurality of parallel delineators crosses a portion of the first plurality of parallel delineators and a portion of the second plurality of parallel delineators.

8. The patch material of claim 7, wherein the third plurality of parallel delineators is spaced apart by a second distance along the operative outer surface.

9. The patch material of claim 7, wherein the first plurality of parallel delineators and the second plurality of parallel delineators define a predefined angle with respect to the third plurality of parallel delineators.

10. The patch material of claim 9, wherein the predefined angle is between 45 degrees and 135 degrees.

11. The patch material of claim 7, wherein the plurality of linear delineators includes a plurality of fourth parallel delineators disposed perpendicular to the third plurality of delineators, wherein the forth plurality of delineators are spaced apart by a third distance along the operative outer surface.

12. The patch material of claim 11, wherein the first, second, third or fourth plurality of delineators are operable to provide a guide for cutting a desired shape for a patch.

13. The patch material of claim 11, wherein the first, second, third and fourth plurality of delineators are operable to provide a guide for cutting a desired shape for a patch.

14. The patch material of claim 1, further comprising a fastener extending through at least one of the plurality of connecting openings, wherein the fastener is selected from a group consisting of at least one of a rivet, a screw, a washer or a nut arrangement.

15. The patch material of claim 14, wherein the fastener is embedded within peripheral material of the operative outer polymeric layer surrounding the at least one of the plurality of connecting openings.

16. The patch material of claim 1, wherein the plurality of delineators is formed by markings.

17. A patch material for repairing a damaged portion of a pressing belt used on an agricultural round baler, the patch material comprising:
an operative outer polymeric layer having a first thickness, and an operative outer layer;
a mounting layer disposed parallel to the operative outer polymeric layer and configured for placement against the pressing belt, the mounting layer having a second thickness being less than the first thickness;
at least one fabric layer disposed between the operative outer polymeric layer and the mounting layer;
a plurality of delineators disposed on the operative outer surface of the operative outer polymeric layer, wherein the plurality of delineators are arranged to define a pattern having a plurality of predefined shapes;
a plurality of connecting openings extending through the operative outer polymeric layer, the at least one fabric layer, and the mounting layer;
wherein at least one of the predefined shapes is arranged to bound a respective one of the plurality of connecting openings; and
wherein the plurality of delineators includes a first plurality of parallel delineators and a second plurality of parallel delineators, wherein the first plurality of parallel delineators cross outlines the second plurality of parallel delineators.

18. The patch material of claim 17, wherein the plurality of delineators include a third plurality of parallel delineators, a portion of the third plurality of parallel delineators crossing a portion of the first plurality of parallel delineators and a portion of the second plurality of parallel delineators.

19. The patch material of claim 18, wherein the plurality of delineators include a plurality of fourth parallel delineators disposed perpendicular to the third plurality of parallel delineators, wherein the fourth plurality of parallel delineators are spaced by a third distance along the operative outer op surface.

20. The patch material of claim 17, wherein the first plurality of parallel delineators and the second plurality of parallel delineators define a predefined angle with respect to the third plurality of parallel delineators, wherein the predefined angle is defined between 45 degrees and 135 degrees.

* * * * *